UNITED STATES PATENT OFFICE.

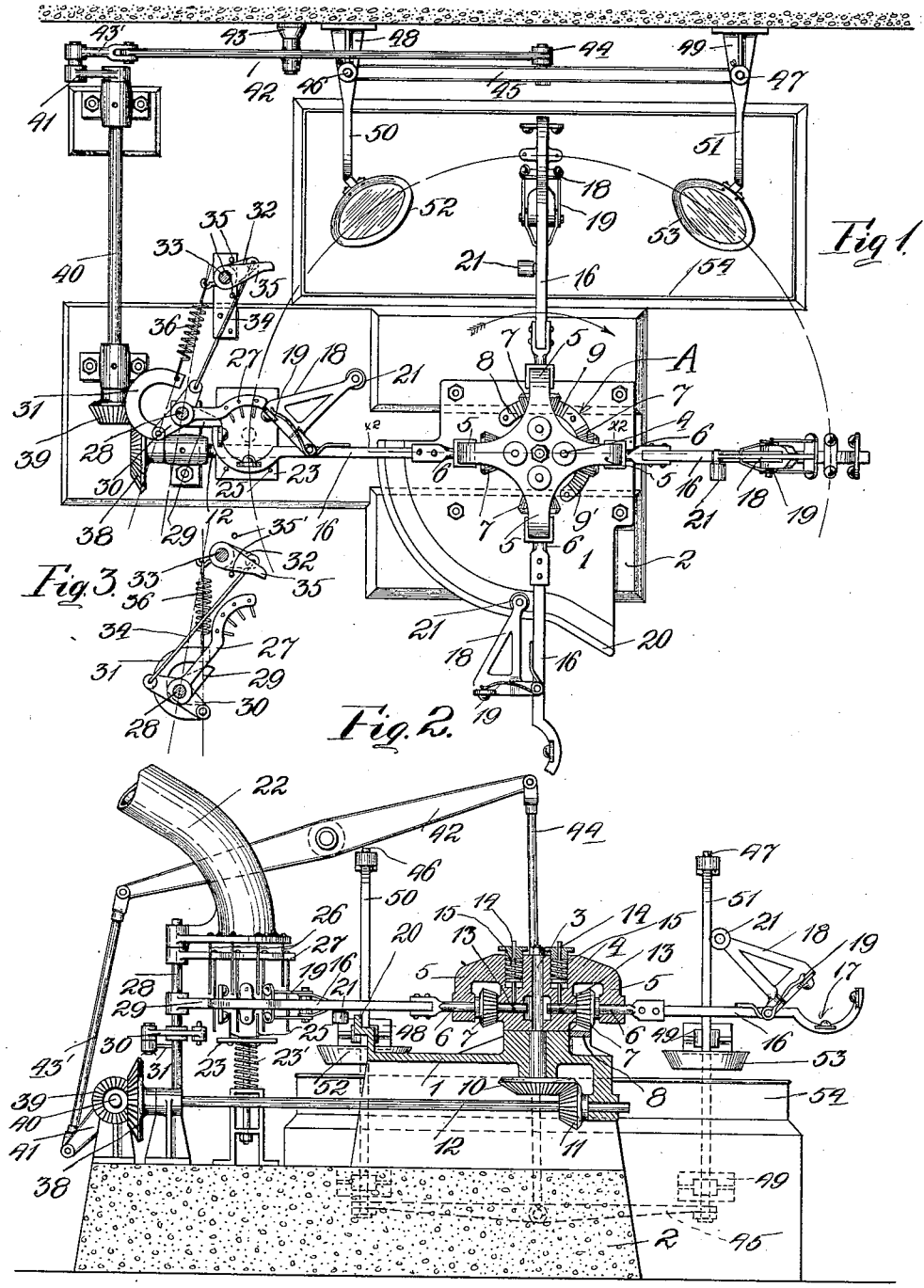

DAVID C. McCAN, OF LOS ANGELES, CALIFORNIA.

DIPPING APPARATUS.

1,064,235.
Specification of Letters Patent.
Patented June 10, 1913.

Application filed August 19, 1912. Serial No. 715,949.

*To all whom it may concern:*

Be it known that I, DAVID C. McCAN, a citizen of the United States, residing at Los Angeles, in the county of Los Angeles and State of California, have invented a certain new and useful Dipping Apparatus, of which the following is a specification.

This invention relates to an apparatus for dipping the ends of blocks, composed principally of wood shavings and like waste material, in a suitable binder, and has for its object to provide a machine for continuously effecting the dipping of the blocks without injury to the same.

Other objects will appear from the following specification, in connection with the accompanying drawing, in which, Figure 1, is a plan view of the invention, showing the carrier arms for the blocks, and the clamping means for the blocks on the arms in open and closed position; the trays containing the liquid binder, and means for raising the trays to cause the blocks to be coated with the binder; the receiving table for the blocks, the gate of the basket for holding the blocks on the table, and the means for actuating the gate. Fig. 2, is a side elevation, partly in section on lines $x^2$—$x^2$, Fig. 1, the gate of the cage being omitted, and Fig. 3, is a plan detail of the gate.

Referring to the drawing, 1, designates a base plate, carried on a suitable foundation 2. On a vertical shaft 3, extending through said plate 1, is locked a head 4, having depending hangers 5, extending free of the head 4. Journaled in said hangers 5, and said head 4, is a plurality of spindles 6, severally provided with pinions 7, disposed in the space between said hangers and head and in line with a segmental bar 8, having two sets of teeth 9, and 9', with which said pinions are arranged to mesh at determined periods to cause a periodical axial rotation of said spindles. On the end of said shaft 3, to which said head is locked, is a bevel gear 10, in mesh with a bevel pinion 11, keyed on a main driving shaft 12, driven by any suitable means, not shown, and through which bevel pinion 11, motion is imparted to the shaft 3. Said spindles are each provided with notches 13, for engagement by pins 14, under the tension of helical springs 15, housed in said head 4, to hold said spindles in positive positions and against movement axially during their revolution with said head. To the ends of the several spindles 6, are fastened carrier arms 16, whose extremities, at 17, are shaped to conform to the shape of the blocks, which are arranged to be held therein by clamps 18, pivotally mounted on said carrier arms 16, and under the tension of springs 19. The base plate 1, is provided with a circular flange 20, by means of which, as the rollers 21, on said clamps 18, engage therewith, such clamps are operated against the tension of the said springs 19, to release the blocks from the carrier arms 16.

The blocks are delivered from a delivery chute 22, to a table 23, supported resiliently by a helical spring, 23', which allows the table to yield to the impact of a descending block and thereby prevent injury to the ends thereof. The said table 23, is provided with upwardly extending pins 25, which, coöperating with pins 26, extending downwardly from said delivery chute 22, form one half of a basket for holding the blocks in a vertical position on said table 23. The other half of said basket is formed by a gate 27, mounted on a vertical shaft 28, on which is also mounted a dog, 29, disposed in the path of travel of the ends of the carrier arms 16, whereby, when said arms 16, strike against said dog 29, the gate 27, is moved to the position substantially as shown in Fig. 3, the movement of the gate occurring nearly simultaneously with the escape of the rollers 21, on the clamps 18, from the circular flange 20, as shown in Fig. 1. Keyed to said shaft 28, is a rocker arm 30, to one end of which is pivotally connected a circular yoke 31, and whose other end is connected with a link 32, on a fixed shaft 33, by a rod 34. Integral with said link 32, is a dog 35, which, when the first named dog 29, occupies the position, shown in Fig. 1, is out of the path of travel of said arms 16, and when the dog 29, occupies the position shown in Fig. 3, is in the path of travel of said carrier arms. These dogs control the opening and closing of the gate 27, in substantially the following manner, Fig. 1, being specifically referred to. The dog 29, is now being engaged by one of the revolving carrier arms 16, simultaneously with or slightly later than the closing of one of the clamps 18, on a block. As the arm continues to revolve, the dog 29, is gradually moved out of the path of the moving arm, causing the shaft 28, and the rocker arm thereon, to oscillate in one direction. When the pivotal connection of the rocker arm 30, and the yoke 31, has passed the central axis of the rocker arm, the spring 36, suddenly asserts itself, causing the rocker arm to quickly complete its oscillatory movement, which, in so doing, draws, through the connecting rod 34, the dog 35, to the position shown in Fig. 3, and in direct line with the path of travel of the arm 16, on which a block is now clamped. The parts being now in the position illustrated in Fig. 3, it is obvious that the engagement of the dog 35, by a carrier arm, will actuate the rocker arm 30, in a direction reverse of that above described, and cause the return of the gate 27, to normal position, in advance of the descent of another block from the chute. Pins 35', are provided to limit the movement of said dog 35.

On the end of said main shaft 12, is a bevel gear 38, in mesh with a bevel pinion 39, on a counter shaft 40, on which is rigidly fastened, a crank 41, connected with a walking beam 42, journaled in a suitable bearing 43, by a connecting rod 43'. On the other end of said walking beam 42, is a rod 44, connected centrally of a horizontal beam 45, to the ends of which are secured vertical bars 46 and 47, reciprocable in guides 48 and 49. Fastened to the upper ends of said bars 48 and 49, are downwardly extending supports 50 and 51, for trays 52 and 53, which are filled with a suitable liquid binder in a tank 54, when caused to descend in the same by said walking beam 42.

In the position of the parts shown in Fig. 1, the trays 52 and 53, are just about to be raised to a height sufficient to cause the ends of the blocks to be coated with the binding fluid therein, it being obvious from the construction, as described, that two carrier arms with the blocks clamped thereon, will simultaneously be in position for dipping. As soon as the blocks have been dipped, the trays descend into the tank 54, while the rotation of the carrier arms about their axes, is effected by the pinions 7, on the spindles 6. It will be understood that the position of the carrier arms 16, after leaving the table 23, remains unchanged, until the end of the block therein has been dipped in one of the trays. The axial rotation of the arms, consecutively, occurs as soon as the pinions mesh with teeth 9, of the rack bar 8, and by such axial rotation, the other end of the block in the arm rotated is dipped in the binder. During such dipping of the end of the block, the arm is revolving with the head 4, but the axial rotation has ceased, since the pinion now passes over the space A, between the sets of teeth 9 and 9'. When the pinion engages the teeth 9', the axial rotation of the arm commences and continues until the pinion swings clear of the teeth, at which time the arm is in substantially the position shown in Fig. 1, and the roller 21, on the clamp is in position to be engaged by the flange 20.

What I claim, is:—

1. In a dipping machine, the combination with a plurality of trays containing a liquid binder, of a means to carry a plurality of blocks, means to move said trays to cause one end of the blocks to be dipped in said binder, means to axially rotate said arms to cause the other end of said blocks to be coated simultaneously with the coating of said first named block, and means to automatically release said blocks from said carrying means.

2. In a dipping machine, the combination with a revoluble head, of a plurality of arms journaled in said head, a table for supporting a block, means on said arms for clamping the block on said table, means to hold said arms in a fixed position during one portion of the revolution thereof, means to axially rotate said arms during another portion of the revolution thereof, a tank containing a liquid binder, a plurality of trays, means to periodically operate said trays to dip same in the liquid binder in said tank and raise them to coat the ends of said blocks, and means to release the blocks from said arms.

3. The combination with a revoluble head, of a plurality of arms journaled in said head, and provided with clamping means, a table on which a block is arranged to be delivered, a basket to support said block in a vertical position, a gate forming one side of said basket, means to cause said clamping means to clamp said block, means to move said gate when said block has been clamped, means to return said gate to normal position, and means to cause both ends of said block to be clamped, said means for causing said clamping means to clamp said block also serving to release said block from said arms after dipping.

In testimony whereof I affix my signature in the presence of two witnesses.

DAVID C. McCAN.

Witnesses:
LILLIAN C. BLOOD,
ANTON GLAETZNER, Jr.